(12) United States Patent
Chen

(10) Patent No.: US 11,641,160 B1
(45) Date of Patent: May 2, 2023

(54) POWER PROVIDING CIRCUIT AND POWER PROVIDING METHOD THEREOF

(71) Applicant: NANYA TECHNOLOGY CORPORATION, New Taipei (TW)

(72) Inventor: Chih-Jen Chen, Kaohsiung (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 17/741,468

(22) Filed: May 11, 2022

(51) Int. Cl.
*H02M 3/07* (2006.01)

(52) U.S. Cl.
CPC .................................. *H02M 3/07* (2013.01)

(58) Field of Classification Search
None
See application file for complete search history.

(56) References Cited

U.S. PATENT DOCUMENTS

| | | | | |
|---|---|---|---|---|
| 5,319,601 | A * | 6/1994 | Kawata | G11C 5/147 327/143 |
| 8,803,575 | B2 | 8/2014 | Terrovitis | |
| 10,141,043 | B1 * | 11/2018 | Lee | G11C 11/4074 |
| 10,153,032 | B1 * | 12/2018 | Hsu | G11C 11/4074 |
| 10,672,453 | B2 * | 6/2020 | Hsu | G11C 5/145 |
| 2006/0062070 | A1 | 3/2006 | Sibigtroth et al. | |
| 2010/0034031 | A1 | 2/2010 | Kang et al. | |
| 2011/0115552 | A1 | 5/2011 | Suzuki et al. | |
| 2014/0292397 | A1 | 10/2014 | Choi | |
| 2020/0202902 | A1 | 6/2020 | Lee | |

FOREIGN PATENT DOCUMENTS

| | | |
|---|---|---|
| TW | 480821 | 3/2002 |
| TW | 200614559 | 5/2006 |
| TW | 200950341 | 12/2009 |
| TW | 202145690 | 12/2021 |
| WO | 2018071187 | 4/2018 |

OTHER PUBLICATIONS

"Office Action of Taiwan Counterpart Application", dated Nov. 11, 2022, p. 1-p. 8.

* cited by examiner

*Primary Examiner* — Jeffery S Zweizig
(74) *Attorney, Agent, or Firm* — JCIPRNET

(57) ABSTRACT

A power providing circuit and a power providing method are provided. The power providing circuit includes at least one first charge pump circuit, at least one second charge pump circuit, a first control circuit, a signal latch, and a voltage detector. The first charge pump circuit is configured to receive a first clock to generate a first pump voltage. The second charge pump circuit is configured to receive the first clock to generate the first pump voltage. The first control circuit is configured to provide the first clock to the first charge pump circuit and the at second charge pump circuit according to a power-on detection signal. The signal latch is coupled to the second charge pump circuit. The voltage detector is configured to receive an operation voltage and generate the power-on detection signal by detecting the operation voltage.

14 Claims, 3 Drawing Sheets

POWER PROVIDING CIRCUIT AND POWER PROVIDING METHOD THEREOF

BACKGROUND

Technical Field

The disclosure relates to a power providing circuit and a power providing method; particularly, the disclosure relates to the power providing circuit and the power providing method for reducing a power up current.

Description of Related Art

Charge pump circuit is often used for pumping up a lower voltage to generate a higher voltage. While an electronic device requires a plurality of different voltages, a plurality of charge pump circuits are used to generate the plurality of different voltage. The charge pump circuits are enabled at the time of the electronic device being powered up. However, damages to electronic components in the electronic device may be caused by the excessive peak current due to a huge amount of the charge pump circuits.

SUMMARY

The disclosure is directed to a power providing circuit and a power providing method for reducing a power up current.

In the disclosure, the power providing circuit includes at least one first charge pump circuit, at least one second charge pump circuit, a first control circuit, a signal latch, and a voltage detector. The first charge pump circuit is configured to receive a first clock to generate a first pump voltage. The second charge pump circuit is configured to receive the first clock to generate the first pump voltage. The first control circuit is configured to provide the first clock to the first charge pump circuit and the at second charge pump circuit according to a power-on detection signal. The signal latch is coupled to the second charge pump circuit. The voltage detector is configured to receive an operation voltage and generate the power-on detection signal by detecting the operation voltage.

In the disclosure, the power providing method is adapted to a power providing circuit including at least one first charge pump circuit, and at least one second charge pump circuit. The power providing method includes: enabling the first charge pump circuit according to an operation voltage, wherein the first charge pump circuit is configured to receive a first clock to generate a first pump voltage; and enabling the second charge pump circuit according to a power-on detection signal and an external command, wherein the second charge pump circuit is configured to receive the first clock to generate the first pump voltage.

Based on the above, according to the power providing circuit and the power up method of the disclosure, the second charge pump circuit remains disabled until the power up ready signal received by the second charge pump circuit is enabled according to a power-up detection signal and an external command. Therefore, while the power providing circuit or the power providing method is implemented in an electronic device, the peak currents induced by the first charge pump circuit and the second pump circuit are respectively generated at different time points, thereby preventing the damage to the electronic components due to excessive peak current.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
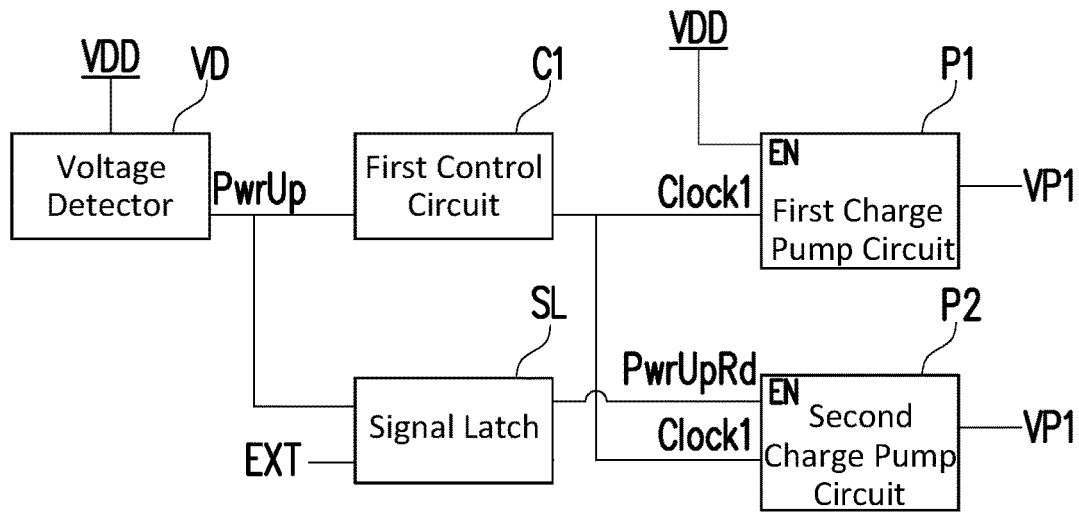
FIG. 1 is a schematic block diagram of a power providing circuit according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

FIG. 1 is a schematic block diagram of a power providing circuit according to an embodiment of the disclosure. With reference to FIG. 1, a power providing circuit 100 may include at least one first charge pump circuit P1, at least one second charge pump circuit P2, a first control circuit C1, a signal latch SL, and a voltage detector VD. The first charge pump circuit P1 is configured to receive a first clock CLOCK1 to generate a first pump voltage VP1. The second charge pump circuit P2 is configured to receive the first clock CLOCK1 to generate the first pump voltage VP1. The first control circuit C1 is configured to provide the first clock CLOCK1 to the first charge pump circuit P1 and the second charge pump circuit P2 according to a power-on detection signal PwrUp. The signal latch SL is coupled to the second charge pump circuit P2. The voltage detector VD is configured to receive an operation voltage VDD and generate the power-on detection signal PwrUp by detecting the operation voltage VDD.

It is noted that, the first charge pump circuit P1 is enabled according to the operation voltage VDD, and the signal latch SL enables the second charge pump circuit P2 according to the power-on detection signal PwrUp and an external command EXT. That is, only the first charge pump circuit P1 is enabled according to the operation voltage VDD, and the second charge pump circuit P2 is not enabled merely according to the operation voltage VDD. Therefore, while the power providing circuit 100 is implemented in an electronic device, the peak current induced by the first charge pump circuit P1 can be effectively limited, thereby a damage to the electronic components of the electronic device due to excessive peak current can be prevented.

In one embodiment, the electronic device may be, for example, a memory device or other devices including electronic components, and this disclosure is not limited thereto.

In one embodiment, the first charge pump circuit P1 and the second charge pump circuit P2 may receive the first clock Clock1 to generate a same voltage (i.e., the first pump voltage VP1). In another embodiment, the first charge pump circuit P1 and the second charge pump circuit P2 may receive the first clock Clock1 to generate different voltages. That is, one or more first charge pump circuits P1 for generating the first pump voltage VP1 are enabled at a first time point, and one or more second charge pump circuits P2 for generating the first pump voltage VP1 or the different voltage are enabled at a second time point which is different from the first time point. Such as that, a total power up current of the power providing circuit 100 can be divided into two parts which are occurred respectively at the first time point and the second time point. The damage to the electronic components of the electronic device due to excessive peak current can be prevented.

In one embodiment, the first charge pump circuit P1 may include an enable end EN which is tied to the operation voltage VDD. When the operation voltage VDD is larger than a preset threshold voltage Vt, the voltage detector VD may enable the power-on detection signal PwrUp by comparing the operation voltage VDD with the preset threshold voltage Vt. Correspondingly, the first control circuit C1 can provide the first clock CLOCK1 when the power-on detection signal PwrUp is enabled. Such as that, the first charge pump circuit P1 may be enabled according to the operation voltage VDD for receiving the first clock CLOCK1 to generate the first pump voltage VP1.

In one embodiment, the second charge pump circuit P2 may also include an enable end EN. The enable end EN is coupled to the signal latch SL. The signal latch SL may provide a power up ready signal PwrUpRd to the enable end EN of the second charge pump circuit P2 to enable the second charge pump circuit P2.

Specifically, the signal latch SL may provide the power up ready signal PwrUpRd to the enable end EN of the second charge pump circuit P2 according to the power-on detection signal PwrUp and the external command EXT. It is worth mentioning that, the signal latch SL may receive the external command EXT after the power-on detection signal PwrUp being enabled. In one embodiment, the external command EXT may be a non-operation (NOP) command, and the NOP command may be generated by an electronic device after the electronic device is powered up. The signal latch SL may latch enabling states of the external command EXT and the power-on detection signal PwrUp to generate the power up ready signal PwrUpRd. When both of the power-on detection signal PwrUp and the external command EXT are enabled, the signal latch SL may provide the power up ready signal PwrUpRd to enable the second charge pump circuit P2 to receive the first clock CLOCK1 to generate the first pump voltage VP1.

Of course, in some embodiments, the external command EXT may be other specific command apart from the NOP command, and this disclosure is not limited thereto.

In one embodiment, the power providing circuit 100 may further include a command decoder. The command decoder may be used to decode the external command EXT. In one embodiment, the command decoder may be integrated with the signal latch SL or be disposed external from the signal latch SL, but this disclosure is not limited thereto.

In this manner, the second charge pump circuit P2 may remain disabled until the power up ready signal PwrUpRd received by the second charge pump circuit P2 is enabled. Therefore, while the power providing circuit 100 is implemented in an electronic device, the peak currents induced by the first charge pump circuit P1 and the second pump circuit P2 are respectively generated at different time points, thereby preventing the damage to the electronic components of the electronic device due to excessive peak current.

Figure 2:
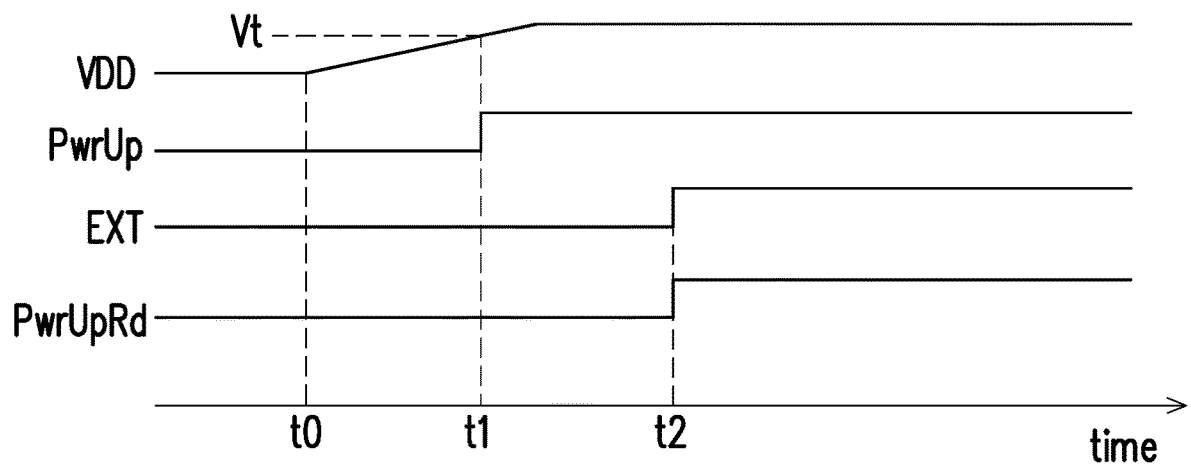
FIG. 2 is a schematic timing chart of a power providing circuit according to an embodiment of the disclosure.

FIG. 2 is a schematic timing chart of a power providing circuit according to an embodiment of the disclosure. With reference to FIG. 1 and FIG. 2, the timing chart 200 may include the operation voltage VDD, the power-on detection signal PwrUp, the external command EXT, and the power up ready signal PwrUpRd. To make the relationship between the operation voltage VDD, the power-on detection signal PwrUp, the external command EXT more comprehensible, the sequence of the operation voltage VDD, the power-on detection signal PwrUp, the external command EXT is described in detail as follows.

At a time point t0, the operation voltage VDD may start to be increased from a preset off voltage to a preset on voltage gradually. At a time point t1, the operation voltage VDD may be larger than a preset threshold voltage Vt. In response to the operation voltage VDD being larger than the preset threshold voltage Vt, the voltage detector VD may enable the power-on detection signal PwrUp. That is, the power-on detection signal PwrUp may be switched from a low logic level to a high logic level.

In response to the power-on detection signal PwrUp, the first control circuit C1 may provide the first clock CLOCK1 to the first charge pump circuit P1, and the first charge pump circuit P1 is enabled by the operation voltage VDD to receive the first clock CLOCK1 to generate the first pump voltage VP1. Especially, the first charge pump circuit P1 is enabled, and the second charge pump circuit P2 remains disabled between the time point t1 and a time point t2.

At the time point t2, the signal latch SL may receive the enabled external command EXT with the high logic level. In response to the external command EXT and the power-on detection signal PwrUp, the signal latch SL may provide the power up ready signal PwrUpRd to the second charge pump circuit P2, and the second charge pump circuit P2 is enabled by the power up ready signal PwrUpRd to receive the first clock CLOCK1 to generate the first pump voltage VP1. That is, the second charge pump circuit P2 is enabled after the first charge pump circuit P1 is enabled.

In this manner, the second charge pump circuit P2 may remain disabled until the time point t2. Therefore, while the power providing circuit 100 is implemented in an electronic device, the peak currents induced by the first charge pump circuit P1 and the second pump circuit P2 are respectively generated at different time points, thereby preventing the damage to the electronic components of the electronic device due to excessive peak current.

It is noted that the high logic level and the low logic level of the signals, voltages, and commands are an exemplary embodiment, and the disclosure is not limited thereto.

Figure 3:
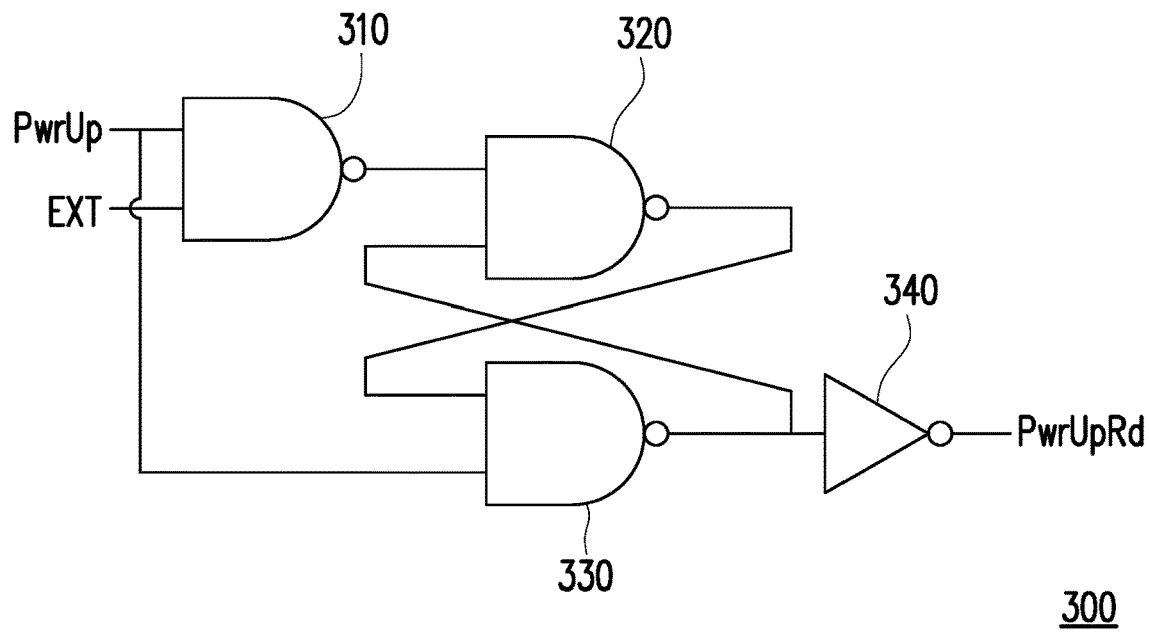
FIG. 3 is a schematic block diagram of a signal latch according to an embodiment of the disclosure.

FIG. 3 is a schematic block diagram of a signal latch according to an embodiment of the disclosure. With reference to FIG. 1 and FIG. 3, the signal latch SL may be a SR latch, and includes a NAND gate 310, a NAND gate 320, a NAND gate 330 and a NOT gate 340.

When the power-on detection signal PwrUp is at the high logic level and the external command EXT is at the high logic level, the NAND gate 310 may output a first output signal with the low logic level. The NAND gate 320 and the NAND gate 330 are cross-coupled to form a latch for retaining the first output signal of the NAND gate 310. The NAND gate 320 and the NAND gate 330 may retain the low logic level of the output signal of the NAND gate 310 and output a second output signal with the low logic level. The NOT gate 340 may enable the power up ready signal PwrUpRd when the second output signal is at the low logic level.

In this embodiment, the signal latch SL is a NAND type SR latch, in another embodiment, the signal latch SL may be a NOR type SR latch, and this disclosure is not limited thereto.

Figure 4:
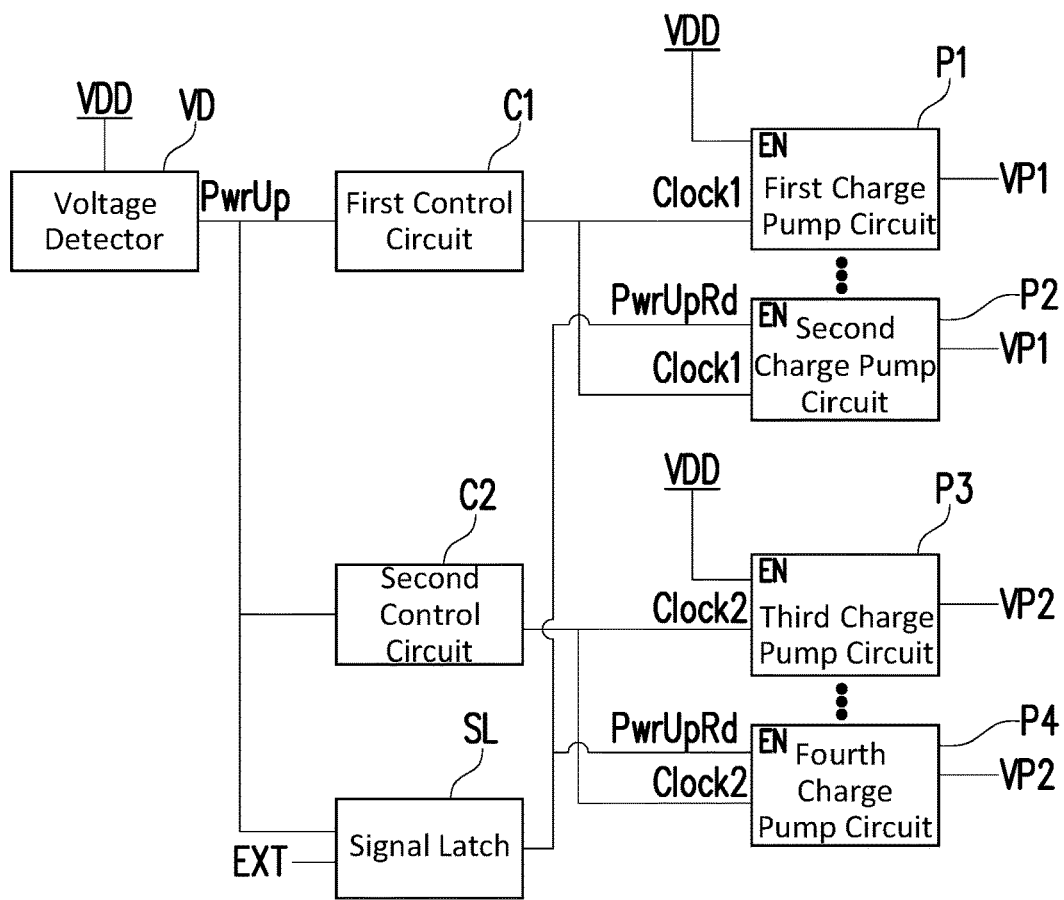
FIG. 4 is a schematic block diagram of a power providing circuit according to an embodiment of the disclosure.

FIG. 4 is a schematic block diagram of a power providing circuit according to an embodiment of the disclosure. With reference to FIG. 1 and FIG. 4, comparing to the power providing circuit 100 of FIG. 1, a power providing circuit 400 may further include at least one third charge pump circuit P3, at least one fourth charge pump circuit P4, and a second control circuit C2. The details of the first charge pump circuit P1, the second charge pump circuit P2, the first control circuit C1, the signal latch SL, and the voltage detector VD may refer to the description of FIG. 1, while the details are not redundantly described seriatim herein.

The third charge pump circuit P3 is configured to receive a second clock CLOCK2 and generating a second pump voltage VP2. The fourth charge pump circuit P4 is configured to receive the second clock CLOCK2 and generating the second pump voltage VP2. The second control circuit C2 is configured to provide the second clock CLOCK2 to the third charge pump circuit P3 and the fourth charge pump circuit P4 according to the power-on detection signal PwrUp. The signal latch SL is coupled to the fourth charge pump circuit P4.

It is noted that, the third charge pump circuit P3 is enabled according to the operation voltage VDD, and the signal latch SL enables the fourth charge pump circuit P4 according to the power-on detection signal PwrUp and the external command EXT. The detailed embodiments of the third charge pump circuit P3, the fourth charge pump circuit P4, and the second control circuit C2 may refer to the first charge pump circuit P1, the second charge pump circuit P2, and the first control circuit C1.

In one embodiment, the first clock CLOCK1 may be same as the second clock CLOCK2. That is, one or more charge pump circuits (e.g., first charge pump circuit P1 and third charge pump circuit P3) of all the charge pump circuits for pumping a same voltage is enabled first, and one or more charge pump circuits (e.g., second charge pump circuit P2 and fourth charge pump circuit P4) of all the charge pump circuits for receiving the same clock is enabled later. In another embodiment, the first clock CLOCK1 may be different from the second clock CLOCK2. That is, one or more charge pump circuits (e.g., first charge pump circuit P1 and third charge pump circuit P3) of all the charge pump circuits for receiving two different clocks is enabled first, and one or more charge pump circuits (e.g., second charge pump circuit P2 and fourth charge pump circuit P4) of all the charge pump circuits for receiving the two different clocks is enabled later. In other words, this disclosure does not limit the first clock CLOCK1 and the second clock CLOCK2 being the same or different.

In this manner, the second charge pump circuit P2 and the fourth charge pump circuit P4 may remain disabled until the power up ready signals PwrUpRd received by the second charge pump circuit P2 and the fourth charge pump circuit P4 are enabled. Therefore, while the power providing circuit 400 is implemented in an electronic device, the peak currents induced by the charge pump circuits are generated at different time points, thereby preventing the damage to the electronic components of the electronic device due to excessive peak current.

Figure 5:
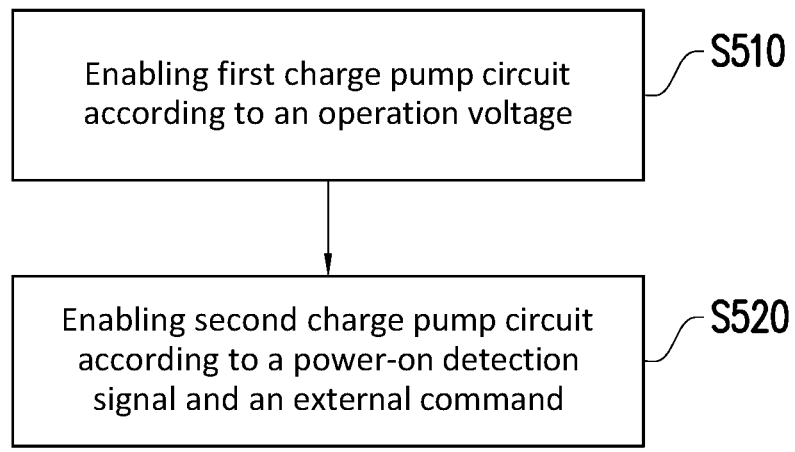
FIG. 5 is a schematic flow chart of a power providing method according to an embodiment of the disclosure.

FIG. 5 is a schematic flow chart of a power providing method according to an embodiment of the disclosure. With reference to FIG. 1 and FIG. 5, the power providing method 500 may be adapted to the power providing circuit 100 or the power providing circuit 400 including at least one first charge pump circuit P1 and at least one second charge pump circuit P2. In addition, the implementation details of the power providing method 500 may be referred to the descriptions of FIG. 1 to FIG. 4 to obtain sufficient teachings, suggestions, and implementation embodiments, while the details are not redundantly described seriatim herein.

In a step S510, the first charge pump circuit P1 is enabled according to the operation voltage VDD. The first charge pump circuit P1 is configured to receive the first clock CLOCK1 to generate the first pump voltage VP1.

In a step S520, the second charge pump circuit P2 is enabled according to the power-on detection signal PwrUp and the external command EXT. The second charge pump circuit P2 is configured to receive the first clock CLOCK1 to generate the first pump voltage VP1.

Details of the steps S510 and S520 have been described in the embodiments mentioned above, and no more repeated description here.

Therefore, while the power providing method 500 is implemented in an electronic device, the peak currents induced by the first charge pump circuit P1 and the second pump circuit P2 are respectively generated at different time points, thereby preventing the damage to the electronic components of the electronic device due to excessive peak current.

In summary, according to the power providing circuit and the power providing method of the disclosure, the second charge pump circuit remains disabled until the power up ready signal received by the second charge pump circuit is enabled. Therefore, while the power providing circuit or the power providing method is implemented in an electronic device, the peak currents induced by the first charge pump circuit and the second pump circuit are respectively generated at different time points, thereby preventing the damage to the electronic components due to excessive peak current.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A power providing circuit, comprising:
at least one first charge pump circuit, receiving a first clock to generate a first pump voltage;
at least one second charge pump circuit, receiving the first clock to generate the first pump voltage;
a first control circuit, providing the first clock to the at least one first charge pump circuit and the at least one second charge pump circuit according to a power-on detection signal;
a signal latch, coupled to the at least one second charge pump circuit; and a voltage detector, receiving an operation voltage and generating the power-on detection signal by detecting the operation voltage, wherein the at least one first charge pump circuit is enabled according to the operation voltage, and the signal latch enables the at least one second charge pump circuit according to the power-on detection signal and an external command.

2. The power providing circuit according to claim 1, wherein the signal latch receives the external command after the power-on detection signal being enabled.

3. The power providing circuit according to claim 1, wherein the voltage detector enables the power-on detection signal when the operation voltage is larger than a preset threshold voltage.

4. The power providing circuit according to claim 1, wherein the at least one first charge pump circuit comprises an enable end tied to the operation voltage.

5. The power providing circuit according to claim 1, wherein
the at least one second charge pump circuit comprises an enable end, and
the signal latch provides a power up ready signal to the enable end of the at least one second charge pump circuit according to the power-on detection signal and the external command.

6. The power providing circuit according to claim 1, wherein
the external command is a non-operation (NOP) command.

7. The power providing circuit according to claim 1, further comprising:
at least one third charge pump circuit, receiving a second clock and generating a second pump voltage;
at least one fourth charge pump circuit, receiving the second clock and generating the second pump voltage; and
a second control circuit, providing the second clock to the at least one third charge pump circuit and the at least one fourth charge pump circuit according to the power-on detection signal,
wherein the signal latch is coupled to the at least one fourth charge pump circuit,
the at least one third charge pump circuit is enabled according to the operation voltage, and the signal latch enables the at least one fourth charge pump circuit according to the power-on detection signal and the external command.

8. A power providing method, adapted to a power providing circuit comprising at least one first charge pump circuit, and at least one second charge pump circuit, wherein the power providing method comprises:
enabling the first charge pump circuit according to an operation voltage, wherein the first charge pump circuit is configured to receive a first clock to generate a first pump voltage; and
enabling the second charge pump circuit according to a power-on detection signal and an external command, wherein the second charge pump circuit is configured to receive the first clock to generate the first pump voltage.

9. The power providing method according to claim 8, further comprising:
receiving the external command after the power-on detection signal being enabled.

10. The power providing method according to claim 8, further comprising:
enabling the power-on detection signal when the operation voltage is larger than a preset threshold voltage.

11. The power providing method according to claim 8, wherein
the at least one first charge pump circuit comprises an enable end tied to the operation voltage.

12. The power providing method according to claim 8, wherein the at least one second charge pump circuit comprises an enable end, and the power providing method further comprises:
providing a power up ready signal to the enable end of the at least one second charge pump circuit according to the power-on detection signal and the external command.

13. The power providing circuit according to claim 8, wherein
the external command is a non-operation (NOP) command.

14. The power providing method according to claim 8, wherein power providing circuit further comprises at least one third charge pump circuit, at least one fourth charge pump circuit, and the power providing method further comprises:
enabling the third charge pump circuit according to an operation voltage, wherein the third charge pump circuit is configured to receive a second clock to generate a second pump voltage; and
enabling the fourth charge pump circuit according to the power-on detection signal and the external command, wherein the fourth charge pump circuit is configured to receive the second clock to generate the second pump voltage.

* * * * *